United States Patent [19]

Salter

[11] 4,206,781
[45] Jun. 10, 1980

[54] SELF-ACTUATED FLOW CONTROL VALVE

[76] Inventor: Jack N. Salter, 2920 Dixie, Pontiac, Mich. 48055

[21] Appl. No.: 913,289

[22] Filed: Jun. 7, 1978

[51] Int. Cl.² ............................................... G05D 7/01
[52] U.S. Cl. ..................................................... 137/504
[58] Field of Search .................................. 137/501, 504

[56] References Cited

U.S. PATENT DOCUMENTS 2,845,086  7/1958  Waterman et al. .................... 137/504
3,502,100  3/1970  Jonson ................................ 137/501 X Primary Examiner—Robert G. Nilson
Attorney, Agent, or Firm—John F. Luhrs

[57] ABSTRACT

A self-actuated flow control valve having a remote adjustable set-point established by varying the energization of a solonoid having an armature articulated to a piston provided with a fluid inlet orifice and reciprocable in a cylinder having an outlet port throttled by the piston upon an increase in flow above set-point and vice versa to restore the rate of flow to set-point.

8 Claims, 2 Drawing Figures

SELF-ACTUATED FLOW CONTROL VALVE

This invention relates to a self-actuated flow control valve and more particularly to a self-actuated flow control valve having a remote adjustable set-point.

On object of this invention is to provide a self-actuated flow control valve having a remote adjustable set-point by means simpler and more economical than heretofore available.

Another object of this invention is to provide such a valve eliminating the use of mechanical mechanisms such as screws, cams, levers, rods, cables and the like in set-point adjustment.

Still another object of this invention is to provide a self-actuated flow control valve wherein the set-point is adjusted by means of a remotely controlled solenoid.

These and other objects of this invention will be apparent as the description proceeds in connection with the drawings in which:

IN THE DRAWINGS

DETAILED DESCRIPTION

Figure 1:
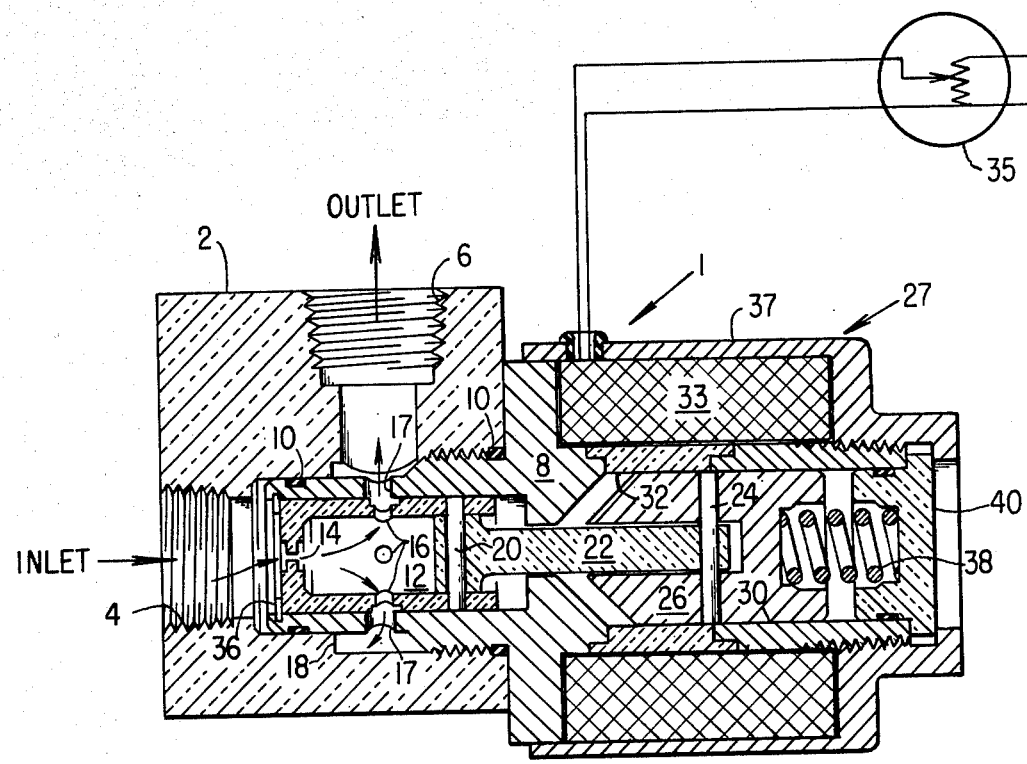
FIG. 1 is a cross section view of a normally open flow control valve having a remote adjustable set-point.

Referring now to the drawings wherein like reference characters designate like or corresponding parts throughout the two views, there is shown a self-actuated flow control valve, generally indicated at 1, having a valve body 2, provided with a fluid inlet port 4, and an outlet port 6. Disposed within the valve body 2 is a valve cage 8 made of a material having a high magnetic permeability such as iron or carbon steel. As shown, the valve cage 8 is screwed into the valve body 2 and held in pressure tight relationship therewith by means of gaskets 10, and is provided with a plurality of outlet ports 17 discharging into a circular groove 18, formed in the valve body 2, in turn discharging into the outlet port 6.

Figure 2:
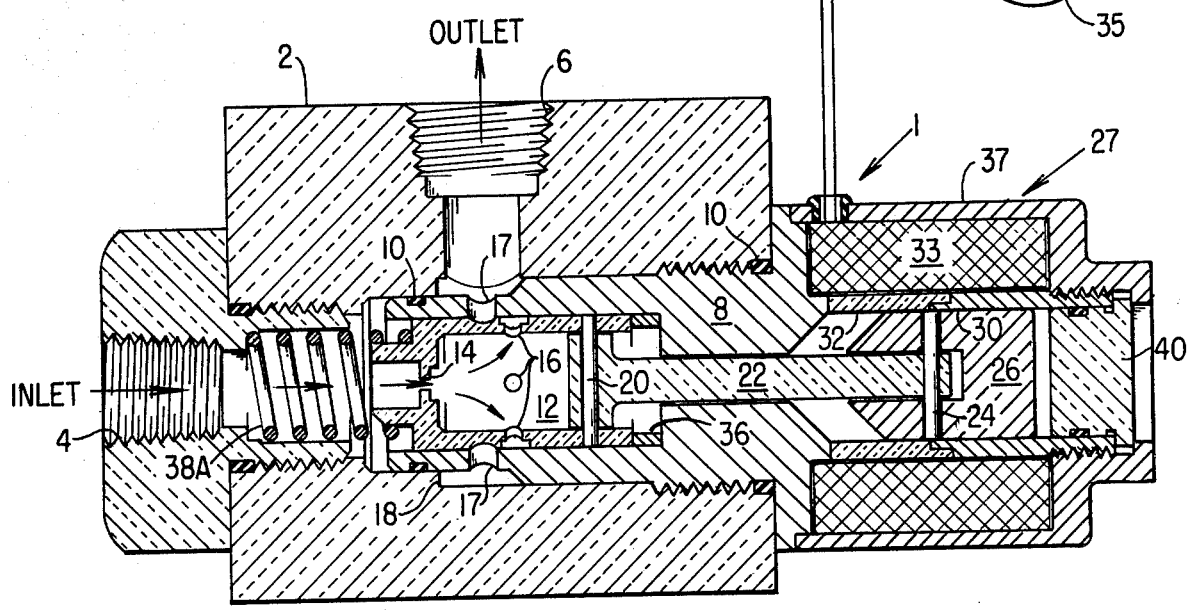
FIG. 2 is a cross section view of a similar, but normally closed flow control valve having a remote adjustable set-point.

Slidably mounted within the valve cage 8 is a hollow cylindrical piston 12 having an axially located fluid inlet orifice 14 and a plurality of outlet ports 16. As shown in FIG. 1, the valve 1 being normally open, the outlet ports 16 are aligned with the outlet ports 17. The flow through the valve is progressively throttled as the piston 12 moves to the right as shown in the drawing which decreases the free area through ports 16 and 17, the operation in effect forming a variable area orifice. As shown in FIG. 2 the valve 1, being normally closed, the outlet ports 16 are to the right as shown in the drawing. Flow through the valve is progressively increased as the piston 12 moves to the left until maximum port area is attained when the ports 16 and 17 are aligned.

Articulated to the piston 12, by means of wrist pins 20, 24 and connecting rod 22 all of which are made of a material having a low magnetic permeability, is a plunger or armature 26 of a solenoid generally indicated at 27. The armature 26 is slidably mounted in a cylinder, having a section 30 remote from the valve cage 8, made of a material having a high magnetic permeability and a section 32, adjacent the valve cage 8, made of a material having a low magnetic permeability such as brass, aluminum or stainless steel. The solenoid winding 33 is energized from a suitable source of D.C. (not shown) and the current therein is regulated by any suitable set-point control means such as a pulse width modulator, but for illustrative purposes shown as a rheostat 35.

The solenoid is provided with an iron or carbon steel shroud 37 and a closure 40 of non-magnetic material. Excitation of the winding 33 sets up a magnetic flux pattern circulating through the shroud 37, cylinder section 30, armature 26, valve cage 8 and thence back to the shroud 37 urging the armature 26 toward the valve cage 8. The attractive force or pull of the armature toward the valve cage is a function of the current flow through the solenoid winding 33; but throughout the range of movement of the armature 26, for a given current flow, the attractive force will be substantially constant by virtue of the valve cage 8 forming a part of the magnetic flux pattern.

Referring to FIG. 1, illustrating a normally open valve, the piston 12 may be bottomed against an anular stop 36, secured in the cage 8, by maintaining a small current flow through the winding 33, or if preferable, by means of an auxiliary compression spring 38. Referring to FIG. 2, illustrating a normally closed valve, the piston 12 may be maintained in the closed position by means of an auxiliary spring 38A. In addition to maintaining the piston 12 in the normally open or normally closed position, as the case may be, the auxiliary spring 38 or 38A may also serve to reduce possible vibration of the moving parts and establish a desired minimum set-point rate of fluid flow.

In operation, referring first to FIG. 1, flow of fluid, which as evident may be either a gas or liquid, produces a differential pressure across the fixed orifice 14 and a proportional axial thrust on armature 26. An opposing or counter axial thrust is produced by the armature 26 proportional to the sum of the forces produced by the current in winding 33 and auxiliary spring 38, if incorporated in the valve. The flow through the valve will be maintained at the rate established when the two thrusts are equal and opposite. Should there be a tendency for the flow through the valve to increase, occasioned, for example, by an increase in fluid pressure at inlet port 4, increasing the thrust on armature 26, there is a corresponding movement of the piston 12, decreasing the free area between outlet ports 16 and 17 as required to maintain the differential pressure across orifice 14, and consequently the flow through the valve, at a value determined by the energization of the solenoid coil 26, which as heretofore described, may be controlled from any desired remote point by adjustment of the set-point rheostat 35.

The operation of the normally closed valve, as shown in FIG. 2, is substantially the same. Therein, energization of the solenoid 33 is regulated as required to obtain a predetermined set-point value of fluid flow by adjustment of the set-point rheostat 35, and thereafter the free area between ports 16 and 17 is self-adjusted to maintain a constant differential and consequently a constant flow through orifice 14.

Preferably the adjacent faces of armature 26 and valve cage 8 are not in contact when the piston 12 is bottomed on anular stop 36 or 36A. Providing a clearance, in the order of 0.020 to 0.100 inches, serves to eliminate possible flow pulsations when the piston is in an extreme travel position.

What is claimed is:

1. A self-actuated flow control valve comprising a piston and a cylinder made of a material having a high permeability in which said piston reciprocates, an orifice in said piston through which fluid is discharged into said cylinder producing an axial thrust proportional to the rate of fluid flow through said orifice, a discharge orifice in the wall of said cylinder proportionately throttled by said piston as the piston traverses said cylinder in response to changes in differential pressure, a solonoid producing a counter axial thrust on said piston having a winding and an armature operatively connected to said piston, a housing for said winding comprising an external shroud of material having a high magnetic permeability in contact with said cylinder, and an internal sleeve in which said armature reciprocates made of a section adjacent said cylinder having a low magnetic permeability and a section remote from said cylinder having a high magnetic permeability and means for adjusting the energization of said coil to thereby vary the counter thrust on said piston to maintain a set-point rate of fluid flow through the valve.

2. A self-actuated flow control valve as set forth in claim 1 wherein said last named means is a rheostat connected in circuit with the solenoid winding.

3. A self-actuated flow control valve as set forth in claim 1 wherein said external shroud, the remote section of said sleeve, said armature and said cylinder comprise the magnetic circuit of said solenoid.

4. A self-actuated flow control valve as set forth in claim 3 further including an armature travel limit maintaining a predetermined clearance between the armature and said cylinder.

5. A self-actuated flow control valve as set forth in claim 4 further including an auxiliary spring urging said armature toward said travel limit.

6. A self-actuated flow control valve as set forth in claim 5 further including a valve body in which said cylinder is housed and having an outlet port through which fluid is discharged from the discharge orifice in said cylinder.

7. A self-actuated flow control valve as set forth in claim 6 wherein said cylinder is provided with a plurality of discharge orifices and said valve body is provided with an anular recess connected to said outlet port into which fluid is discharged from said plurality of dicharge orifices.

8. A self-actuated flow control valve as set forth in claim 1 wherein said armature is articulated to said piston.

* * * * *